W. L. DAILEY.
DRAFT EQUALIZER.
APPLICATION FILED MAR. 14, 1914.

1,100,123.

Patented June 16, 1914.

Witnesses
Robert M. Sutphen
A. A. Hind

Inventor
W. L. DAILEY

By Watson E. Coleman
Attorney

UNITED STATES PATENT OFFICE.

WIRT L. DAILEY, OF MANKATO, KANSAS.

DRAFT-EQUALIZER.

1,100,123.  Specification of Letters Patent.  Patented June 16, 1914.

Application filed March 14, 1914. Serial No. 824,746.

*To all whom it may concern:*

Be it known that I, WIRT L. DAILEY, a citizen of the United States, residing at Mankato, in the county of Jewell and State of Kansas, have invented certain new and useful Improvements in Draft-Equalizers, of which the following is a specification, reference being had to the accompanying drawings.

This invention relates to new and useful improvements in draft equalizers, and more particularly to an equalizer which is adapted for use in connection with grain binders or other similar harvesting machines.

In the usual grain binder three horses are generally provided to draw the binder over the ground, the horses being connected to a pole which is arranged at one side of the frame of the vehicle, so that the horses do not interfere with the gathering device of the binder. As the horses are attached to the draft pole to one side of the frame, the binder is generally drawn over the surface of the ground at a slight angle to the rows of bundles of grain with which the gathering device of the binder is adapted to engage.

An object of this invention is the provision of an equalizer which will obviate the side draft, this object being attained by the provision of means to attach a draft animal to the binder on the opposite side of the gathering device thereof from the usual draft pole.

Another object of this invention is the provision of a draft equalizer for grain binders, comprising animal attaching means connected to the opposite sides of the binder frame, the attaching means being connected to each other by a flexible element whereby the draft is equalized on both sides of the frame.

Figure 1:
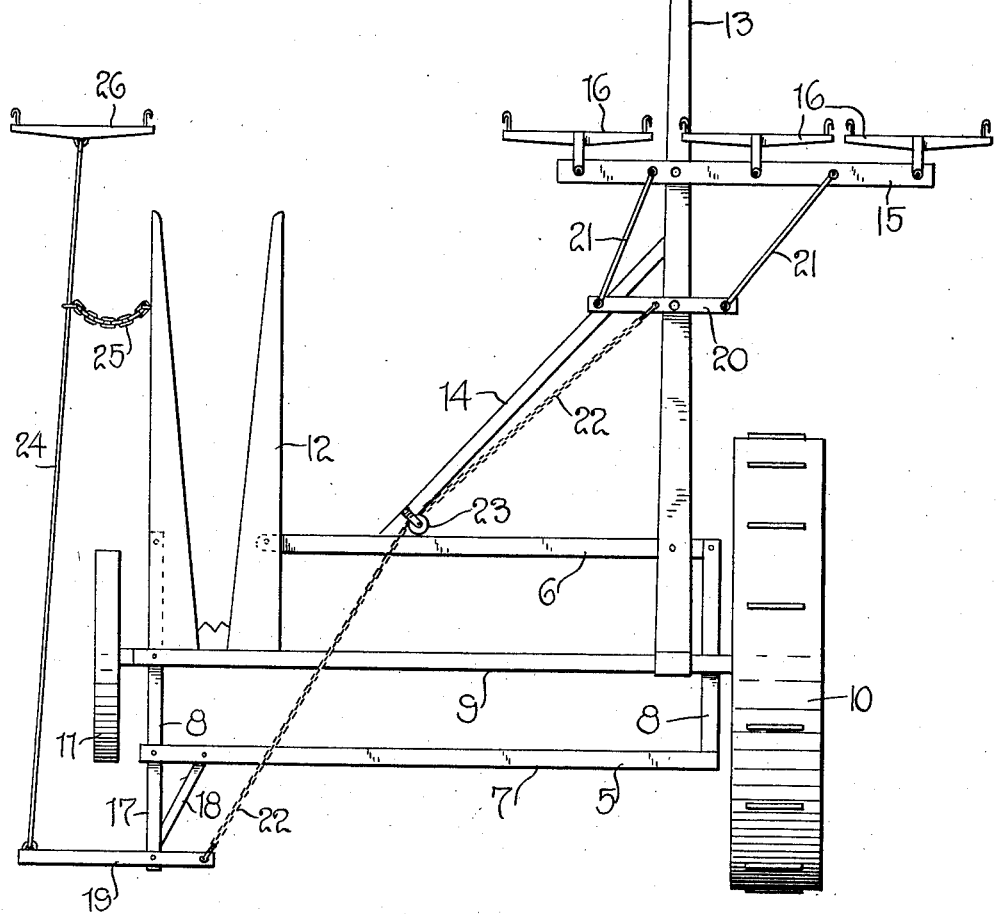
Figure 2:

With these and other objects in view, my invention consists in the novel construction, combination, and arrangements of parts to be hereinafter more fully described, claimed, and illustrated in the accompanying drawing, in which, Figure 1 is a top plan view of a binder showing my improved draft equalizer connected thereto; and Fig. 2 is a detail section showing the manner of connecting the pulley to the brace.

Referring more particularly to the drawings, the binder which may be of any desired construction, is illustrated as comprising a substantially rectangular frame 5, which consists of the front and rear bars 6 and 7 respectively, and side bars 8. Connected to the side bars centrally thereof is an axle 9 which extends beyond the opposite ends of the frame, and mounted upon one end of the axle is a drive wheel 10, and a grain wheel 11 is connected to the opposite end of the axle. A forwardly extending gathering device 12 is connected to the forward portion of the frame at one end thereof, and a draft pole 13 is connected to the frame 5 adjacent its opposite end. A suitable brace bar 14 is connected at its rear end to the front bar 6 of the frame and at its forward end to the pole 13. Pivotally connected at a point to one side of its center to the pole is a draft bar 15, to which three swingletrees 16 are connected whereby draft animals may be connected to the machine.

The side bar 8 of the frame adjacent the gathering device 12 projects rearwardly from the rear bar 7 as at 17, the rearwardly projecting portion 17 of the side bar being braced by a suitable brace bar 18. Pivotally connected adjacent one end thereof to the rear extremity of the extension 17 is a lever 19, the long end of which extends outwardly beyond the outer face of the grain wheel 11. Pivotally connected to the pole 13 rearwardly of the draft bar 15 is another lever 20, which is connected at its opposite ends to the draft bar 15 on opposite sides of the pole 13 by links 21. A chain 22 is connected at its forward end to the inner end of the lever 20, the chain extending rearwardly through a guide pulley 23 carried by the brace 14, and the rear end of the chain being connected to the short or inner end of the lever 19 carried at the rear end of the frame. Connected at its rear end to the outer end of the lever 17, is a forwardly extending rod 24 which extends through a guide member 25 connected to the gathering device near its forward end, and the forward extremity of the rod 24 is connected to a swingletree 26 to which a fourth draft animal may be attached.

In the practical use of a binder having my improved draft equalizer connected thereto, three animals are connected to the swingletrees 16 as usual, and an animal is also attached to the swingletree 26 on the end of the pull rod 24. It will be seen that the fourth animal which is attached to the binder walks between the rows of grain so as not to interfere with the operation of the gathering device 12. When the animals are connected to the swingletrees as described, and pull the machine over the surface of the ground so that the gathering device 12 engages the stalks of grain, the side draft will be obviated by reason of the swingletree 26, and the draft on both sides of the vehicle may be equalized by the flexible connection of the swingletree 26 with the draft bar 15 which supports the swingletrees 16.

It will be understood that the construction of the binder shown in the drawing is merely for convenience in illustrating the application of my improved equalizer, and that the equalizer may be connected to any form of binder or other similar harvesting machine.

While I have shown the preferred embodiment of my invention, it will be understood that minor changes in the construction, combination, and arrangement of parts may be made within the scope of the appended claims without departing from the spirit of my invention or sacrificing any of the advantages of the same.

Having thus fully described my invention, what I claim and desire to secure by Letters Patent is:

1. A device of the character described comprising the combination with a wheeled frame, a pole extending forwardly from said frame at one side thereof, draft animal attaching means carried by said pole, of a lever pivotally connected at one side of the center thereof to the frame at its rear end and at the opposite side thereof to the pole, the long end of said lever extending outwardly beyond the outer face of one of said wheels, a forwardly extending rod connected to the outer extremity of said lever, an animal attaching device carried by the forward end of said rod, and flexible means carried by said frame for connecting the inner end of said lever, and the animal attaching means carried by the pole.

2. A device of the character described comprising the combination with a wheeled frame, a draft pole extending forwardly from the frame at one end thereof, a bar extending rearwardly from said frame at its opposite end, of a lever pivotally connected at one side of its center to the extremity of said bar, a forwardly extending rod connected to the outer end of said lever, animal attaching means carried by the forward end of said rod, a lever pivotally connected to said pole rearwardly of said animal attaching means thereon, links connecting the opposite ends of the last-mentioned lever to said animal attaching means, and a flexible member connected to said frame, said flexible member having its opposite ends connected to said levers, as and for the purpose described.

In testimony whereof I hereunto affix my signature in the presence of two witnesses.

WIRT L. DAILEY.

Witnesses:
L. C. DAILEY,
G. R. WELLMAN.

Copies of this patent may be obtained for five cents each, by addressing the "Commissioner of Patents, Washington, D. C."